(12) United States Patent
Nishio et al.

(10) Patent No.: US 10,270,309 B2
(45) Date of Patent: Apr. 23, 2019

(54) ELECTRIC SUPPLY STRUCTURE

(71) Applicant: AISIN SEIKI KABUSHIKI KAISHA, Kariya-shi (JP)

(72) Inventors: Takashi Nishio, Kariya (JP); Kiyotaka Jidaisho, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 815 days.

(21) Appl. No.: 14/227,638

(22) Filed: Mar. 27, 2014

(65) Prior Publication Data

US 2014/0292003 A1    Oct. 2, 2014

(30) Foreign Application Priority Data

Mar. 28, 2013    (JP) ................................ 2013-068614

(51) Int. Cl.
*E05B 79/02*    (2014.01)
*H02K 5/22*    (2006.01)
(Continued)

(52) U.S. Cl.
CPC ............. *H02K 5/225* (2013.01); *E05B 79/02* (2013.01); *E05B 81/06* (2013.01); *E05B 81/54* (2013.01);
(Continued)

(58) Field of Classification Search
CPC ........... Y10T 292/1021; Y10T 70/7062; Y10T 292/1082; Y10S 292/23; Y10S 292/53;
(Continued)

(56) References Cited

U.S. PATENT DOCUMENTS 5,028,084 A * 7/1991 Fukumoto ............... E05B 81/06
  292/201
5,564,308 A * 10/1996 Hoshikawa ............. E05B 81/25
  292/201

(Continued)

FOREIGN PATENT DOCUMENTS

GB         2527645 A  * 12/2015  ............. E05B 81/54
JP    2006-266027 A     10/2006
JP    WO 2013099745 A1 *  7/2013  ............. E05B 81/06

*Primary Examiner* — Alyson M Merlino
(74) *Attorney, Agent, or Firm* — Buchanan Ingersoll & Rooney PC (57) ABSTRACT

An electric supply structure includes a body including plural shaft support portions, a housing being joined with the body, a motor being positioned between the body and the housing, being restricted from moving in an axial direction of a motor shaft by the shaft support portion and being rotatably supported about the motor shaft, a terminal being connected to the motor, and a connector being provided with an insertion hole. The terminal includes a bus bar portion movably mounted to the body, a motor-side terminal portion being fixed on the motor so as to supply electricity and a connector-side terminal portion being positioned to be inserted into the insertion hole. The housing includes first and second pressing portions having different stiffnesses and being configured to hold the motor while displacing a rotational attitude of the motor about the motor shaft in a specific direction by pressing the motor.

7 Claims, 5 Drawing Sheets

(51) Int. Cl.
  *E05B 81/06*  (2014.01)
  *H02K 7/116*  (2006.01)
  *E05B 85/02*  (2014.01)
  *E05B 81/54*  (2014.01)

(52) U.S. Cl.
  CPC ............ *E05B 85/02* (2013.01); *H02K 7/1166* (2013.01); *Y10T 292/1082* (2015.04)

(58) Field of Classification Search
  CPC .......... E05B 79/02; E05B 81/06; E05B 85/02; E05B 81/54
  See application file for complete search history.

(56) References Cited

U.S. PATENT DOCUMENTS

| | | | | |
|---|---|---|---|---|
| 5,909,918 | A * | 6/1999 | Kowalewski | E05B 81/06 292/142 |
| 6,232,684 | B1 * | 5/2001 | Haag | E05B 81/06 292/201 |
| 2004/0245786 | A1 * | 12/2004 | Hashiba | E05B 81/54 292/216 |
| 2011/0241360 | A1 * | 10/2011 | Kitamura | E05B 81/90 292/201 |

\* cited by examiner

ELECTRIC SUPPLY STRUCTURE

CROSS REFERENCE TO RELATED APPLICATIONS

This application is based on and claims priority under 35 U.S.C. § 119 to Japanese Patent Application 2013-068614, filed on Mar. 28, 2013, the entire content of which is incorporated herein by reference.

TECHNICAL FIELD

This disclosure generally relates to an electric supply structure.

BACKGROUND DISCUSSION

A known electric supply structure is disclosed in JP2006-266027A (hereinafter referred to as Patent reference 1). As disclosed in Patent reference 1, the electric supply structure is configured such that a terminal is positioned between a body, which is described as a main case in Patent reference 1 and a motor, which is positioned between the body and a housing. A connector held, or retained at the terminal is positioned between the body and the housing. Alternatively, the connector may be integrally formed with the housing and may be held, or retained at the terminal when the housing and the body are joined, or attached one another.

As disclosed in Patent reference 1, the electric supply structure is configured such that the terminal is held, or fixed on the motor, which is held, or fixed by the two members, the body and the housing. Because the terminal does not have to be fixed on the body, manufacturing processes, for example, thermal welding, for fixing the terminal on the body are not required, leading to the reduction in manufacturing man-hours. However, according to the construction disclosed in Patent reference 1, the terminal integrally moves with the motor.

The motor is positioned, for example, inside a motor housing portion and is restricted from moving in an axial direction of a motor shaft by a shaft support portion which is mounted to the body while being rotatably supported about the motor shaft. Further, the motor is held, or fixed by the two members, the body and the housing. Thus, due to, for example, manufacturing errors of the body and the motor, the rotating and holding attitude, or position of the motor (rotating attitude, or position of the motor rotating about the motor shaft while being held by the two members, the body and the housing) varies in either normal rotational direction or reverse rotational direction at the time of assembling the motor. Accordingly, the rotating and holding attitude, or position of the terminal which moves integrally with the motor varies in either normal rotational direction or reverse rotational direction, leading to the inferior mountability of the mating connector which is held, or retained at the terminal in a later process.

A need thus exists for an electric supply structure which is not susceptible to the drawback mentioned above.

SUMMARY

According to an aspect of the disclosure, an electric supply structure includes a body including plural shaft support portions, a housing being joined with the body, a motor being positioned between the body and the housing, being restricted from moving in an axial direction of a motor shaft by the shaft support portion and being rotatably supported about the motor shaft, a terminal being connected to the motor, and a connector being provided with an insertion hole. The terminal includes a bus bar portion being positioned at an intermediate portion of the terminal and movably mounted to the body, a motor-side terminal portion being provided at a first end portion of the terminal and being fixed on the motor so as to supply electricity and a connector-side terminal portion being provided at a second end portion of the terminal and being positioned to be inserted into the insertion hole. The housing includes a first pressing portion and a second pressing portion having different stiffnesses and being configured to hold the motor while displacing a rotational attitude of the motor about the motor shaft in a specific direction by pressing the motor.

According to another aspect of the disclosure, a door lock apparatus for a vehicle includes an electric supply structure including a body including plural shaft support portions, a housing being joined with the body, a motor being positioned between the body and the housing, being restricted from moving in an axial direction of a motor shaft by the shaft support portion and being rotatably supported about the motor shaft, a terminal being connected to the motor, and a connector being provided with an insertion hole. The terminal includes a bus bar portion being positioned at an intermediate portion of the terminal and movably mounted to the body, a motor-side terminal portion being provided at a first end portion of the terminal and being fixed on the motor so as to supply electricity and a connector-side terminal portion being provided at a second end portion of the terminal and being positioned to be inserted into the insertion hole. The housing includes a first pressing portion and a second pressing portion having different stiffnesses and being configured to hold the motor while displacing a rotational attitude of the motor about the motor shaft in a specific direction by pressing the motor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
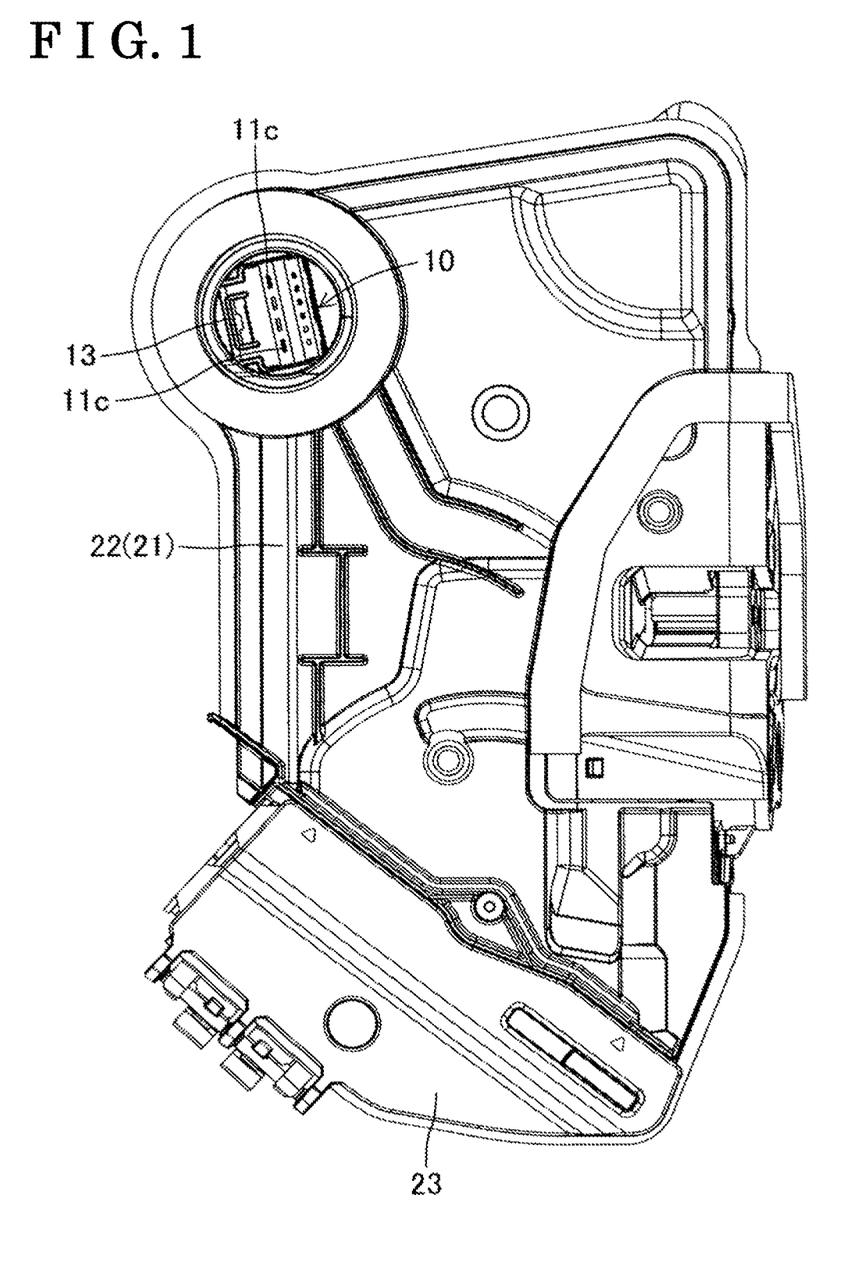
FIG. 1 is a side view of a door lock apparatus for a vehicle including an electric supply structure in a view from an inner door panel according to an embodiment disclosed here.
Figure 2:
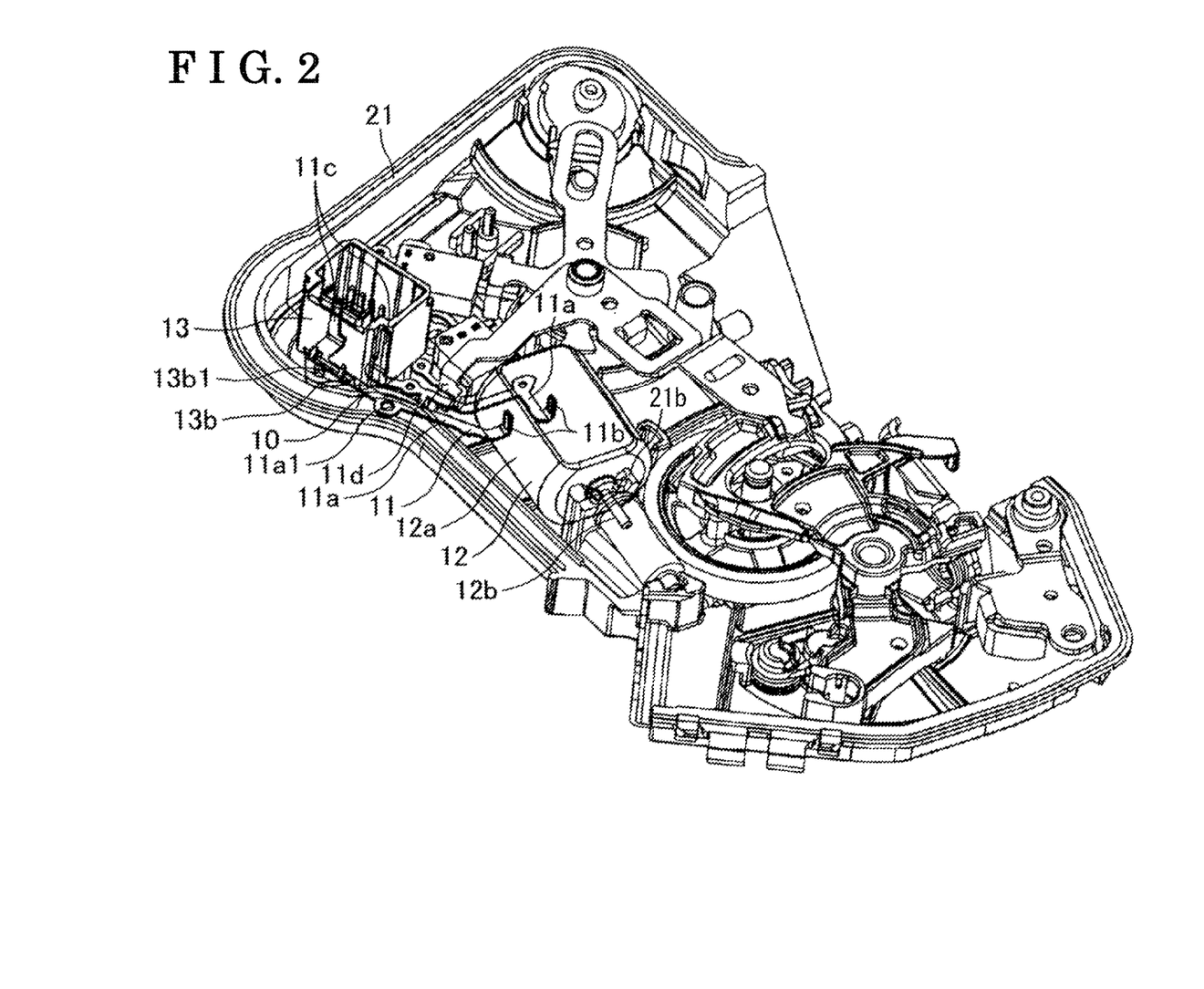
FIG. 2 is a perspective view of an internal structure of the door lock apparatus for the vehicle before mounting a housing and a cover to a body shown in FIG. 1.
Figure 3:
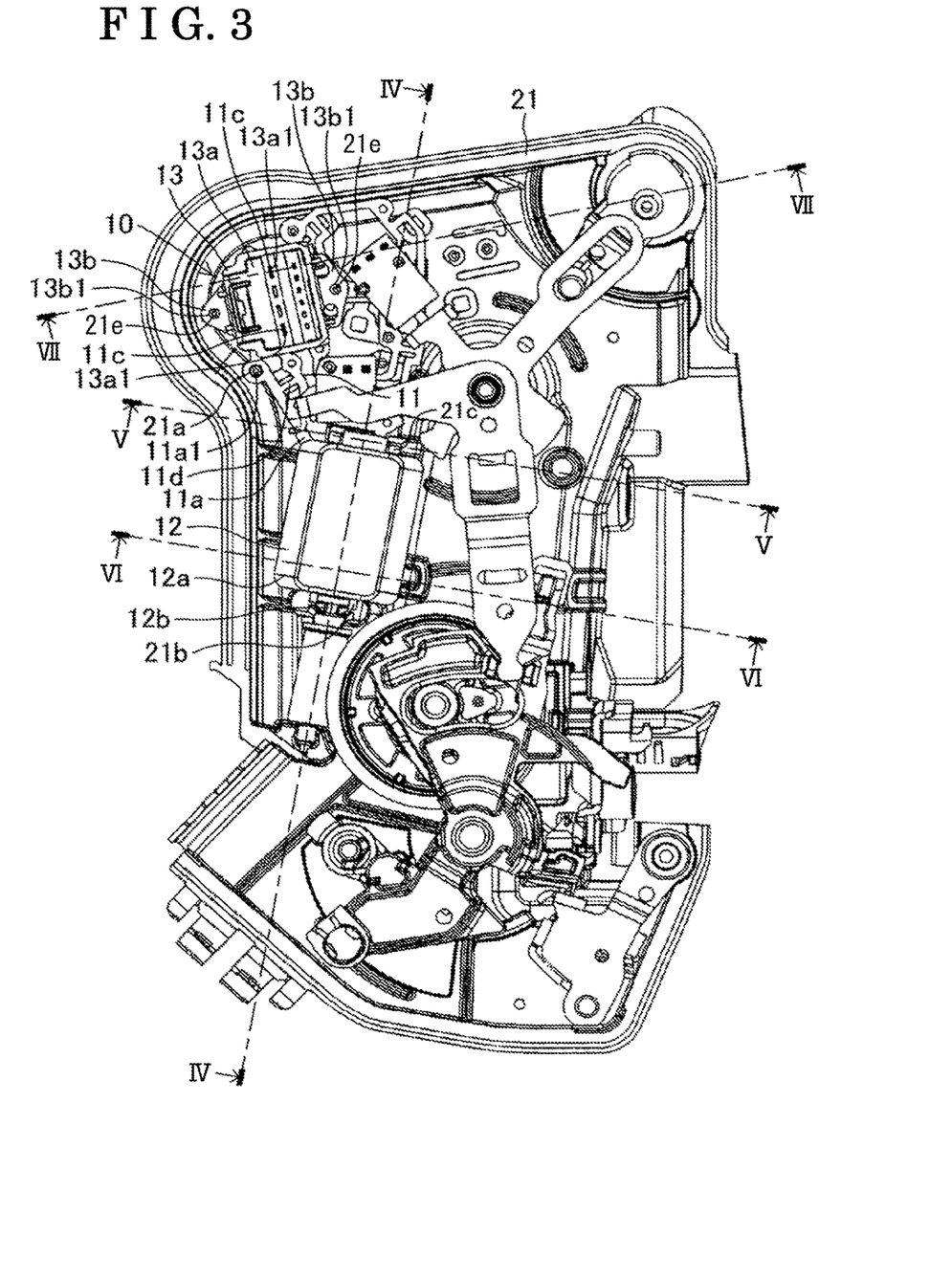
FIG. 3 is a side view of the door lock apparatus for the vehicle shown in FIG. 2 in a view from the inner door panel.

An embodiment of a disclosure will be explained referring to the attached drawings. The embodiment of a door lock apparatus for a vehicle including an electric supply structure of the disclosure is shown in FIGS. 1 to 7. As illustrated in FIGS. 1 to 3, an electric supply structure 10 of the embodiment is mounted between a body 21 and a housing 22 which are joined, or attached one another. The electric supply structure 10 includes a terminal 11, a motor 12 and a connector 13. According to the door lock apparatus for the vehicle in FIG. 1, the body 21 and the housing 22 are joined and integrated. A cover 23 configured to open and close the body 21 engages with the housing 22 to maintain a closed state. The body 21, the housing 22, and the cover 23 are made of resin.

The electric supply structure 10 for supplying electricity to the motor 12 includes the terminal 11, the motor 12, and the connector 13. According to the electric supply structure 10, a mating connector connected to the connector 13 shown in FIG. 1 is fitted into the connector 13 from the outside of the housing 22. As illustrated in FIG. 2, outlines of the terminal 11, the motor 12 and the connector 13 are shown in solid line to facilitate the understanding of the constructions of the terminal 11, the motor 12 and the connector 13 which are the components of the electric supply structure 10.

The terminal 11 is a sheet-shaped electric conductive member whose intermediate portion includes a pair of bus bar portions 11a. A first end portion of the terminal 11 corresponds to a pair of motor-side terminal portions 11b, and a second end portion of the terminal 11 corresponds to a pair of connector-side terminal portions 11c. As illustrated in FIG. 3, each of the bus bar portions 11a includes a mounting hole 11a1 and is mounted on a protrusion 21a provided at the body 21 using the mounting hole 11a1 of the bus bar portion 11a in a slightly movable manner. Each of the motor-side terminal portions 11b is press fitted and fixed into a hole portion for electric conduction provided at a motor housing portion 12a of the motor 12 so as to supply electricity. In a state where each of the motor-side terminal portions 11b is mounted to the motor housing portion 12a, the terminal 11 integrally moves with the motor 12. As illustrated in FIG. 3, each of the connector-side terminal portions 11c is inserted into a insertion hole 13a1 provided at a bottom wall 13a of the connector 13 to be slightly movable relative to the insertion hole 13a1. The respective motor-side terminal portions 11b and the connector-side terminal portions 11c are formed to be bent in a sheet thickness direction of the connector-side terminal portion 11c relative to the bus bar portions 11a. According to the terminal 11 illustrated in FIGS. 2 and 3, the pair of the bus bar portions 11a is connected one another at respective intermediate portions by a connection portion 11d. Further, the plural insertion holes 13a1 are provided to accord with the number of the connector-side terminal portions 11c. Alternatively, for example, the plural insertion holes 13a1 may be communicated with one another to make a single insertion hole.

Figure 4:
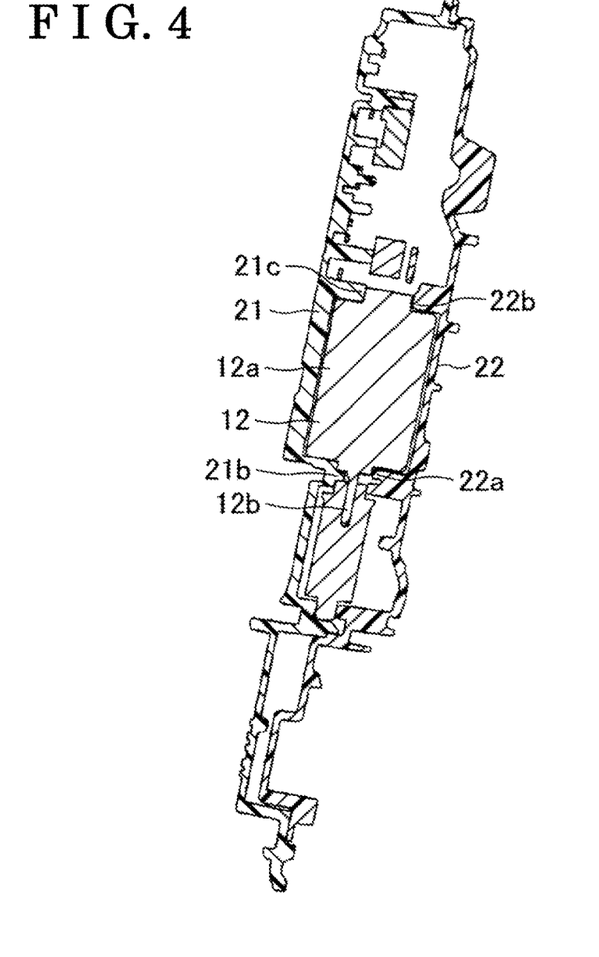
FIG. 4 is a cross sectional view of the door lock apparatus for the vehicle in FIG. 1 taken along line IV-IV in FIG. 3.
Figure 5:
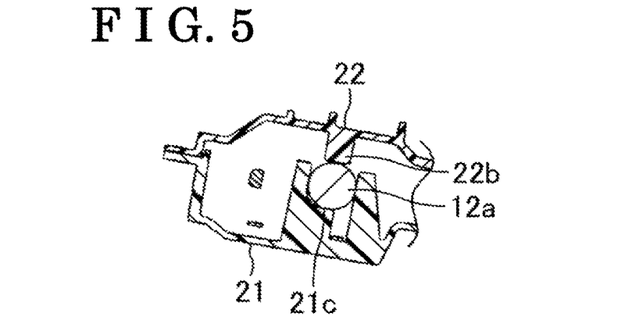
FIG. 5 is a cross sectional view of the door lock apparatus for the vehicle in FIG. 1 taken along line V-V in FIG. 3.

As illustrated in FIGS. 2 to 4, the motor 12 includes the motor housing portion 12a and a motor shaft 12b. As illustrated in FIGS. 1 and 4, the motor 12 is accommodated in the motor housing portion 12a to be unmovably held between the body 21 and the housing 22. As illustrated in FIGS. 2 and 3, the motor 12 is restricted from moving in the axial direction of the motor shaft 12b by a first shaft support portion 21b and a second shaft support portion 21c which are provided at the body 21 and are rotatably supported to rotate by a predetermined amount about the motor shaft 12b. The first and second shaft support portions 21b and 21c serve as a pair. As illustrated in FIG. 4, the housing 22 includes a first shaft support portion 22a and a second shaft support portion 22b, corresponding to the body 21 including the first and second shaft support portions 21b and 21c, which face the first and second shaft support portions 21b and 21c of the body 21 and include a similar function of the first and second shaft support portions 21b and 21c.

Figure 6:
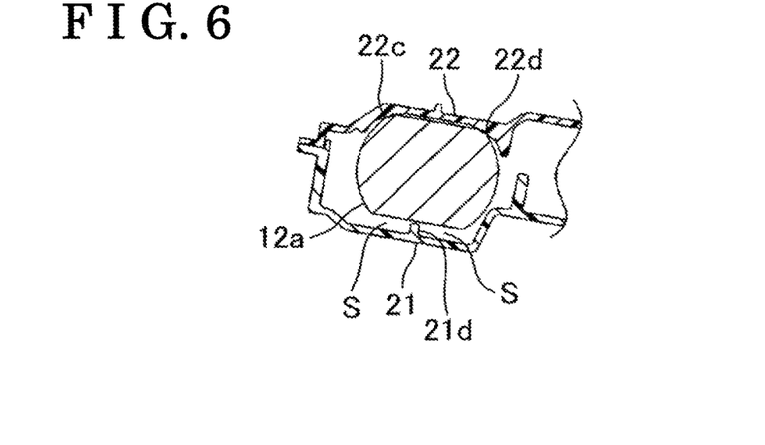
FIG. 6 is a cross sectional view of the door lock apparatus for the vehicle in FIG. 1 taken along line VI-VI in FIG. 3.

As illustrated in FIG. 6, the housing 22 includes a first pressing portion 22c and a second pressing portion 22d which have different stiffnesses. The first and second pressing portions 22c and 22d serve as a pair. The rotating and holding attitude, or position of the motor 12 about the motor shaft 12b shown in FIG. 6 is established in a specific direction, for example, a reverse rotational direction in FIG. 6 and by the predetermined amount by the pair of the pressing portions 22c and 22d. The predetermined amount to establish the rotating and holding attitude, or position of the motor 12 may be set desirably. The motor housing portion 12a of the motor 12 rotates relative to the first and second shaft support portions 21b and 21c of the body 21 and the first and second shaft support portions 22a and 22b of the housing 22, and does not engage with any portion other than the first and second shaft support portions 21b and 21c of the body 21 and the first and second shaft support portions 22a and 22b of the housing 22. Further, as illustrated in FIG. 6, the body 21 includes a support rib 21d which supports the motor 12. Spaces S are provided at opposing sides of the support rib 21d and are extended in the axial direction of the motor 12. Each of the spaces S allows the rotation of the motor housing portion 12a. Alternatively, the motor housing portion 12a may be configured to engage with the support rib 21d. In those circumstances, the motor housing portion 12a rotates about the support rib 21d which corresponds to a fulcrum point.

Each of the first and second pressing portions 22c and 22d is formed by including (integrally molding) ribs on an inner wall surface of the housing 22. The first pressing portion 22c shown on the left in FIG. 6 is formed to be thicker (in an up-down direction in FIG. 6) by the predetermined amount than the second pressing portion 22d shown on the right in FIG. 6 so that the stiffness of the first pressing portion 22c is higher by the predetermined amount than that of the second pressing portion 22d. According to the embodiment, the stiffness of the respective first and second pressing portions 22c and 22d changes, or differs by changing the thickness of the same resin material. Alternatively, the stiffness may change, or differ by changing the forms of the respective first and second pressing portions 22c and 22d other than changing the thickness of the respective first and second pressing portions 22c and 22d. Further, the stiffness may change, or differ by changing the material of either the first pressing portion 22c or the second pressing portion 22d.

Figure 7:
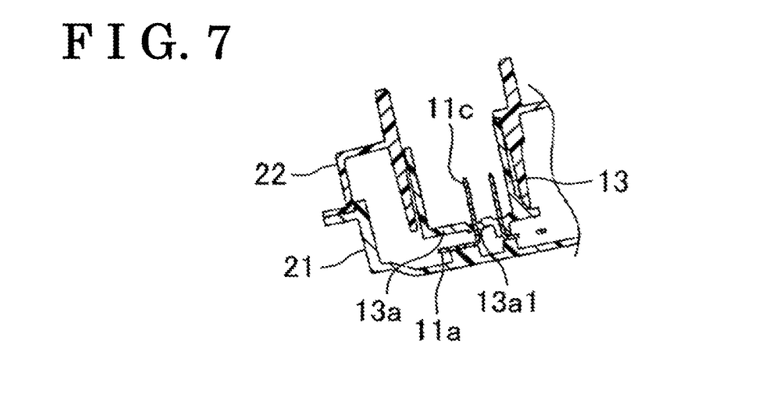
FIG. 7 is a cross sectional view of the door lock apparatus for the vehicle in FIG. 1 taken along line VII-VII in FIG. 3.

A bottom portion of the connector 13 includes a bottom wall 13a and a pair of flange portions 13b. As illustrated in FIG. 3, each of the flange portions 13b is provided with a mounting hole 13b1 which is fitted and fixed on a protrusion 21e mounted to the body 21. As illustrated in FIG. 7, the connector 13 is sandwiched and fixed by the body 21 and the housing 22 when the body 21 and the housing 22 are joined, or attached one another.

According to the aforementioned electric supply structure 10, the terminal 11, the motor 12, and the connector 13 are mounted between the body 21 and the housing 22 through following mounting processes. First, the terminal 11 is positioned such that the mounting hole 11a1 of the bus bar portion 11a is inserted by the protrusion 21a of the body 21. Second, each of the motor-side terminal portions 11b is press fitted and fixed into the hole portion for electric conduction provided at the motor housing portion 12a of the motor 12.

The motor 12 provided at the motor housing portion 12a is restricted from moving in the axial direction of the motor shaft 12b by the first and second shaft support portions 21b and 21c of the body 21 while being rotatably supported about the motor shaft 12b. Third, each of the insertion holes 13a1 of the connector 13 is inserted by each of the connector-side terminal portions 11c of the terminal 11. The mounting hole 13b1 of each of the flange portions 13b is fitted by the protrusion 21e of the body 21. Fourth, the connection portion 11d connecting each of the bus bar portions 11a of the terminal 11 is broken to disconnect each of the bus bar portions 11a. Fifth, the housing 22 and the body 21 are joined and fixed to fix and hold the motor 12 and the connector 13 on the housing 22 and the body 21.

According to the electric supply structure 10 of the embodiment, the first and second pressing portions 22c and 22d provided at the housing 22 have the different stiffnesses. When the first and second the pressing portions 22c and 22d are formed, for example, in the same size, that is, the length in the up-down direction in FIG. 6 is assumed to be the same, the amount of elastic deformation applied by the second pressing portion 22d which has the lower stiffness than the first pressing portion 22c is greater than the amount of elastic deformation applied by the first pressing portion 22c which has the higher stiffness than the second pressing portion 22d. Thus, when the motor 12 is held between the body 21 and the housing 22 in the motor housing portion 12a, the motor 12 is pressed by the first pressing portion 22c stronger than the second pressing portion 22d because the first pressing portion 22c has the higher stiffness than the second pressing portion 22d. Then, the rotating and holding attitude of the motor 12 is established in the specific direction and by the predetermined amount. The rotating and holding attitude or position of the motor 12 is held, or retained at the attitude, or position, as illustrated in FIG. 6, where respective pressing powers applied by the first and second pressing portions 22c and 22d are balanced one another. Thus, according to the electric supply structure 10 of the embodiment, the rotating and holding attitude, or position of the motor 12 is prevented from varying in either normal rotational direction or reverse rotational direction when the motor 12 is mounted.

According to the electric supply structure 10 of the embodiment, each of the bus bar portions 11a positioned at the intermediate portion of the terminal 11 is movably mounted to the body 21. Each of the motor-side terminal portions 11b is press fitted and fixed into the motor 12 so as to supply the electricity while each of the connector-side terminal portions 11c is positioned to be inserted into each of the insertion holes 13a1 provided at the connector 13. Thus, the manufacturing processes for fixing the terminal 11 on the body 21 when mounting the terminal 11 to the body 21 are not required, leading to the reduction in the manufacturing process.

According to the electric supply structure 10 of the embodiment, when the motor 12 is held between the body 21 and the housing 22, the terminal 11 and the motor 12 integrally rotate with one another in the specific direction. Thus, the terminal 11, the same as the motor 12, can be prevented from varying in either normal rotational direction or reverse rotational direction after being mounted to the electric supply structure 10. The rotating and holding attitude, or position of the terminal 11 after the assembling is not varied in either normal rotational direction or reverse rotational direction. Therefore, according to the electric supply structure 10 of the embodiment, the connector-side terminal portions 11c and the mating connector may be displaced in the specific direction, leading to the improved mountability of the connector-side terminal portions 11c and the mating connector.

According to the aforementioned embodiment, each of the connector-side terminal portions 11c, the same as the motor-side terminal portion 11b, is formed to be bent at substantially 90 degrees in the thickness direction of the connector-side terminal portion 11c relative to each of the bus bar portions 11a. Alternatively, as a modified example of the embodiment illustrated in FIG. 8, an extra bent amount β may be applied to a bent portion 11c1 of the connector-side terminal portion 11c to perform a zero correction to a displacement of each of the connector-side terminal portions 11c in response to the rotational displacement of the motor 12 in the specific direction. The extra bent amount β for performing the zero correction corresponds to a degree substantially the same as the rotational degree in the specific direction of the motor 12. The bent portion 11c1 is bent relative to the degree substantially 90 degrees in the embodiment to the opposite direction of the specific direction of the motor 12 by the extra bent amount β. Thus, the amount of displacement between the connector-side terminal portions 11c of the terminal 11 and the mating connector may be decreased, leading to the improved mountability of the mating connector connecting to the connector-side terminal portions 11c of the terminal 11.

Figure 8:
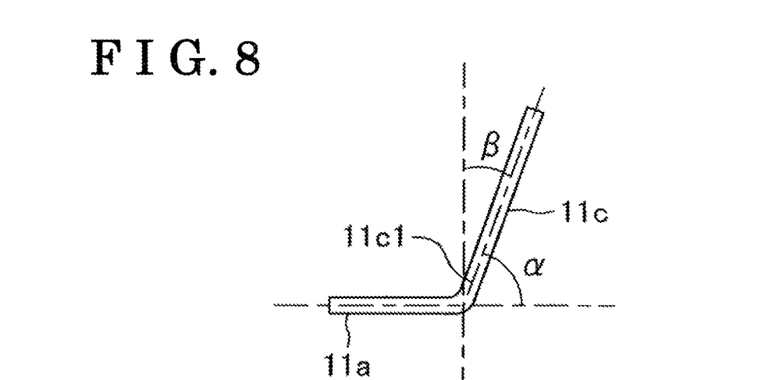
FIG. 8 is a schematic enlarged view of a connector-side terminal portion of a terminal according to a modified example of the embodiment applying an extra bent amount to a bus bar portion.

As illustrated in FIG. 8, a bent angle α in the thickness direction of the connector-side terminal portions 11c relative to the bus bar portion 11a is favorably an acute angle by applying the extra bent amount β to the bent portion 11c1 of the connector-side terminal portion 11c relative to the bus bar portion 11a of the terminal 11. Compared to a case where the bent angle α in the thickness direction of the connector-side terminal portions 11c relative to the bus bar portion 11a is 90 degrees or obtuse angle, the man-hours for manufacturing the terminal 11 is reduced, leading to the cost reduction.

According to the aforementioned embodiment, the connector 13 and the housing 22 are separately formed. Alternatively, according to the disclosure, a connector corresponding to the connector 13 may be integrally formed with the housing 22. After connecting the motor 12 to the terminal 11 and accommodating the motor 12 in the body 21, each of the bus bar portions 11a may be disconnected by breaking the connection portion 11d connecting each of the bus bar portions 11a of the terminal 11. Then, the aforementioned third and fifth processes may be performed simultaneously.

According to the aforementioned embodiment, the electric supply structure 10 includes the body 21 including the plural, first and second shaft support portions 21b and 21c, the housing 22 being joined with the body 21, the motor 12 being positioned between the body 21 and the housing 22, being restricted from moving in the axial direction of the motor shaft 12b (motor shaft) by the first and second shaft support portions 21b and 21c and being rotatably supported about the motor shaft 12b (motor shaft), the terminal 11 being connected to the motor 12, and the connector 13 being provided with the insertion hole 13a1. The terminal 11 includes the bus bar portion 11a being positioned at the intermediate portion of the terminal 11 and movably mounted to the body 21, the motor-side terminal portion 11b being provided at the first end portion of the terminal 11 and being fixed on the motor 12 so as to supply electricity and the connector-side terminal portion 11c being provided at the second end portion of the terminal 11 and being positioned to be inserted into the insertion hole 13a1. The housing 22 includes the first pressing portion 22c and the second pressing portion 22d having different stiffnesses and being configured to hold the motor 12 while displacing the rotational attitude of the motor 12 about the motor shaft 12b (motor shaft) in the specific direction by pressing the motor 12.

According to the electric supply structure 10 of the embodiment, the first and second pressing portions 22c and 22d provided at the housing 22 have the different stiffnesses. When the first and second pressing portions 22c and 22d are formed, for example, in the same size, that is, the length in the up-down direction in FIG. 6 is assumed to be the same, the amount of elastic deformation applied by the second pressing portion 22d which has the lower stiffness than the first pressing portion 22c is greater than the amount of elastic deformation applied by the first pressing portion 22c which has the higher stiffness than the second pressing portion 22d. Thus, when the motor 12 is held between the body 21 and the housing 22 in the motor housing portion 12a, the motor 12 is pressed by the first pressing portion 22c stronger than the second pressing portion 22d because the first pressing portion 22c has the higher stiffness than the second pressing portion 22d. Then, the rotating and holding attitude of the motor 12 is established in the specific direction and by the predetermined amount. The rotating and holding attitude or position of the motor 12 is held, or retained at the attitude, or position, as illustrated in FIG. 6, where the respective pressing powers applied by the first and second pressing portions 22c and 22d are balanced one another. Thus, according to the electric supply structure 10 of the embodiment, the rotating and holding attitude, or position of the motor 12 is prevented from varying in either normal rotational direction or reverse rotational direction when the motor 12 is mounted.

According to the electric supply structure 10 of the embodiment, each of the bus bar portions 11a positioned at the intermediate portion of the terminal 11 is movably mounted to the body 21. Each of the motor-side terminal portions 11b is press fitted and fixed into the motor 12 so as to supply the electricity while each of the connector-side terminal portions 11c is positioned to be inserted into each of the insertion holes 13a1 provided at the connector 13. Thus, the manufacturing processes for fixing the terminal 11 on the body 21 when mounting the terminal 11 to the body 21 are not required, leading to the reduction in the manufacturing process.

According to the electric supply structure 10 of the embodiment, the motor 12 includes the motor housing portion 12a being supported by the first and second shaft support portions 21b and 21c.

According to the electric supply structure 10 of the embodiment, when the motor 12 is held between the body 21 and the housing 22, the terminal 11 and the motor 12 integrally rotate with one another in the specific direction. Thus, the terminal 11, the same as the motor 12, can be prevented from varying in either normal rotational direction or reverse rotational direction after being mounted to the electric supply structure 10. The rotating and holding attitude, or position of the terminal 11 after the assembling is not varied in either normal rotational direction or reverse rotational direction. Therefore, according to the electric supply structure 10 of the embodiment, the connector-side terminal portions 11c and the mating connector may be displaced in the specific direction, leading to the improved mountability of the connector-side terminal portions 11c and the mating connector.

According to the aforementioned embodiment, the terminal 11 includes the bent portion 11c1 formed by bending the connector-side terminal portion 11c in the thickness direction of the connector-side terminal portion 11c relative to the sheet-shaped bus bar portion 11a, and the bent portion 11c1 is applied with the extra bent amount β for performing the zero correction to the displacement of the connector-side terminal portion 11c in response to a rotational displacement of the motor 12 in the specific direction.

According to the aforementioned construction, the amount of displacement between the connector-side terminal portions 11c of the terminal 11 and the mating connector may be decreased, leading to the improved mountability of the mating connector connecting to the connector-side terminal portions 11c of the terminal 11.

According to the aforementioned embodiment, the bent angle α at the bent portion 11c1 in the thickness direction of the connector-side terminal portion 11c relative to the bus bar portion 11a is the acute angle.

According to the aforementioned construction, compared to the case where the bent angle α in the thickness direction of the connector-side terminal portions 11c relative to the bus bar portion 11a is 90 degrees or obtuse angle, the man-hours for manufacturing the terminal 11 is reduced, leading to the cost reduction.

According to the aforementioned embodiment, the first pressing portion 22c and the second pressing portion 22d are made from the same material and integrally formed at the housing 22.

According to the aforementioned construction, the first and second pressing portions 22c and 22d may be simply formed with a low manufacturing cost compared to the case where the pair of the pressing portions is formed by different members and materials.

According to the aforementioned embodiment, the electric supply structure 10 further includes the support rib 21d being provided at the body 21 to be contactable with the motor housing portion 12a and functioning as the fulcrum point by being in contact with the motor housing portion 12a when the rotational attitude of the motor 12 about the motor shaft 12b (motor shaft) is displaced in the specific direction.

According to the aforementioned embodiment, the door lock apparatus for the vehicle includes the electric supply structure 10 including the body 21 including the plural, first and second shaft support portions 21b and 21c, the housing 22 being joined with the body 21, the motor 12 being positioned between the body 21 and the housing 22, being restricted from moving in the axial direction of the motor shaft 12b (motor shaft) by the first and second shaft support portions 21b, 21c and being rotatably supported about the motor shaft 12b (motor shaft), the terminal 11 being connected to the motor 12, and the connector 13 being provided with the insertion hole 13a1. The terminal 11 includes the bus bar portion 11a being positioned at the intermediate portion of the terminal 11 and movably mounted to the body 21, the motor-side terminal portion 11b being provided at the first end portion of the terminal 11 and being fixed on the motor 12 so as to supply electricity and the connector-side terminal portion 11c being provided at the second end portion of the terminal 11 and being positioned to be inserted into the insertion hole 13a1. The housing 22 includes the first pressing portion 22c and the second pressing portion 22d having different stiffnesses and being configured to hold the motor 12 while displacing the rotational attitude of the motor 12 about the motor shaft 12b (motor shaft) in the specific direction by pressing the motor 12.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric supply structure, comprising:
   a motor including a motor housing portion and being positioned between a body, including a plurality of shaft support portions, and a housing joined with the body, being restricted from moving in an axial direction of a motor shaft by the plurality of shaft support portions, and being supported about the motor shaft;
   a support rib provided at the body to be contactable with the motor housing portion and functioning as a fulcrum point by being in contact with the motor housing portion when a rotational attitude of the motor about the motor shaft is displaced in a specific direction;
   at least one terminal being connected to the motor; and
   a connector being provided with at least one insertion hole, wherein
   the at least one terminal includes a bus bar portion being positioned at an intermediate portion of the at least one terminal and being movably mounted to the body, a motor-side terminal portion being provided at a first end portion of the at least one terminal and being fixed on the motor so as to supply electricity to the motor and a connector-side terminal portion being provided at a second end portion of the at least one terminal and being positioned to be inserted into the at least one insertion hole,
   the housing includes a first pressing portion and a second pressing portion having different stiffnesses and being configured, during joining of the housing with the body, to hold the motor while displacing the rotational attitude of the motor about the motor shaft in the specific direction by pressing the motor, and
   the body defines spaces between a wall of the body and a flat side of the motor housing portion that extend in the axial direction of the motor shaft along opposite sides of the support rib, said opposite sides of the support rib being parallel to the axial direction of the motor shaft.

2. The electric supply structure according to claim 1, wherein the motor housing portion is supported by the plurality of the shaft support portions.

3. The electric supply structure according to claim 1, wherein the at least one terminal includes a bent portion formed by bending the connector-side terminal portion in a thickness direction of the connector-side terminal portion relative to the bus bar portion, and the bent portion is applied with an extra bent amount for performing a zero correction to a displacement of the connector-side terminal portion in response to the displacing of the rotational attitude of the motor in the specific direction by bending the bent portion at an acute angle in the thickness direction of the connector-side terminal portion relative to the bus bar portion.

4. The electric supply structure according to claim 3, wherein a bent angle at the bent portion in the thickness direction of the connector-side terminal portion relative to the bus bar portion is an acute angle.

5. The electric supply structure according to claim 1, wherein the first pressing portion and the second pressing portion are made from the same material and integrally formed on the housing.

6. A door lock apparatus for a vehicle, comprising:
   a body including a plurality of shaft support portions;
   a housing being joined with the body;
   an electric supply structure, which includes:
      a motor including a motor housing portion, being positioned between the body and the housing, being restricted from moving in an axial direction of a motor shaft by the plurality of shaft support portions, and being supported about the motor shaft;
      at least one terminal being connected to the motor;
      a connector being provided with at least one insertion hole; and
      a support rib provided at the body to be contactable with a flat side of the motor housing portion and functioning as a fulcrum point by being in contact with the motor housing portion when a rotational attitude of the motor about the motor shaft is displaced in a specific direction, wherein
   the at least one terminal includes a bus bar portion being positioned at an intermediate portion of the at least one terminal and being movably mounted to the body, a motor-side terminal portion being provided at a first end portion of the at least one terminal and being fixed on the motor so as to supply electricity to the motor and a connector-side terminal portion being provided at a second end portion of the at least one terminal and being positioned to be inserted into the at least one insertion hole,
   the housing includes a first pressing portion and a second pressing portion having different stiffnesses and being configured, during joining of the housing with the body, to hold the motor while displacing the rotational attitude of the motor about the motor shaft in the specific direction by pressing the motor, and
   the body defines spaces between a wall of the body and the motor that extend in the axial direction of the motor shaft along opposite sides of the support rib, said opposite sides of the support rib being parallel to the axial direction of the motor shaft.

7. The electric supply structure according to claim 1, wherein the support rib extends in the axial direction of the motor shaft.

* * * * *